(12) United States Patent
Liu et al.

(10) Patent No.: US 11,509,437 B2
(45) Date of Patent: Nov. 22, 2022

(54) SIGNAL PROCESSING METHOD AND DEVICE

(71) Applicant: VIVO MOBILE COMMUNICATION CO., LTD., Chang'an Dongguan (CN)

(72) Inventors: Siqi Liu, Chang'an Dongguan (CN); Yue Ma, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/122,582

(22) Filed: Dec. 15, 2020

(65) Prior Publication Data
US 2021/0099264 A1    Apr. 1, 2021

Related U.S. Application Data

(63) Continuation of application No. PCT/CT2019/095544, filed on Jul. 11, 2019.

(30) Foreign Application Priority Data

Jul. 11, 2018   (CN) .......................... 201810760126.7

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ............................ H04L 5/0048; H04W 72/042
See application file for complete search history.

(56) References Cited

U.S. PATENT DOCUMENTS

| | | | |
|---|---|---|---|
| 2014/0126527 | A1 | 5/2014 | Xiong et al. |
| 2015/0092630 | A1 | 4/2015 | Lin et al. |
| 2017/0094624 | A1 | 3/2017 | Balachandran et al. |

FOREIGN PATENT DOCUMENTS

| | | |
|---|---|---|
| CN | 102883441 A | 1/2013 |
| CN | 105637779 A | 6/2016 |
| WO | 2018106043 A1 | 6/2018 |

OTHER PUBLICATIONS

International Search Report & Written Opinion related to Application No. PCT/CN/2019/095544; dated Jan. 21, 2021.
ZTE, Sanechips, "Remaining details of Synchronization Signal Design", Oct. 9-13, 2017, 3GPP TSG RAN WG1 Meeting #90bis, Prague, Czech Republic.
Extended European Search Report for related Application No. 19834465.7; dated Aug. 19, 2021.
VIVO, "Remaining issues on RACH procedure", May 21-25, 2018, 3GPP TSG RAN WG1 Meeting #93, Busan Korea.
VIVO, "Clarification on the misaligned SSB-RO association in SIB1 and ServingCellconfigCommon", Jul. 2-6, 2018, 3GPP TSG-RAN WG2 Meeting #Ad hoc 1802, Montreal, Canada.

(Continued)

*Primary Examiner* — Ronald B Abelson
(74) *Attorney, Agent, or Firm* — von Briesen & Roper, s.c.

(57) ABSTRACT

Embodiments of this disclosure provide a signal processing method and device. The method includes: transmitting first information via RMSI, and/or transmitting second information via RRC signaling; wherein SSB related information indicated by the first indication information is at least partially same as SSB related information indicated by the second indication information.

18 Claims, 4 Drawing Sheets

(56) References Cited

OTHER PUBLICATIONS

R1-1808214, Source: vivo, "Discussion on ssb-PositionsInBurst mismatch in SIB1 and ServingcellConfigCommon" Document for: Discussion and Decision, Agenda item: 5, Release:3GPP TSG RAN WG1 Meeting #94, Aug. 20-24, 2018, Gothenburg, Sweden.
R2-1809896, Source: NTT Docomo, Inc., "[D004] ssb-PositionsInBurst in ServingCellConfigCommonSIB" Document for: Discussion, Agenda item: 10.4.3.2, Release 3GPP TSG RAN WG2 Meeting NR-AH#1807, Jul. 2-6, 2018, Montreal, Canada.
Japanese Office Action related to Application No. JP 2021-500655 dated Jan. 6, 2022.
Japanese Reasons For Refusal Office Action related to JP Application No. 2021-500655 dated Aug. 23, 2022.
Singapore Office Action related to Application No. 11202012717X dated Sep. 7, 2022.
R1-1807049, Source: NTT DOCOMO, Inc., "Remaining issues on synchronization signal" Document for: Discussion and Decision, Agenda Item: 7.1.1.1, Release: 3GPP TSG RAN WG1 Meeting #93, May 21-25, 2018, Busan, Korea.
R2-1806940, Source: Nokia, Alcatel-Lucent Shanghai Bell, "Discrepancy in signaling ssb-PositionInBurst" Document for: Discussion and Decision, Agenda item: 10.4.1.3.1.1, Release: 3GPP TSG-RAN WG2 Meeting #102, May 21-25, Apr. 2018, Busan.
R2-1810887, Source: vivo, "Report offline [046] ssb-PositionInburst in SIB1 and ServincellConfigCommon" Document for: Discussion and Decision, Agenda Item: 10.4.1.3.1.1, Release: 3GPP TSG-RAN WG2 AH-1807, Jul. 2-6, 2018, Montreal, Canada.

SIGNAL PROCESSING METHOD AND DEVICE

CROSS-REFERENCE TO RELATED APPLICATION

The present application is a continuation of PCT Application No. PCT/CN2019/095544 filed on Jul. 11, 2019, which claims a priority to the Chinese patent application No. 201810760126.7 filed in China on Jul. 11, 2018, disclosures of which are incorporated herein by reference in their entireties.

TECHNICAL FIELD

Embodiments of the present disclosure relate to the field of communications technology, in particular to a signal processing method and device.

BACKGROUND

In a new radio (NR) system, a base station needs to transmit a synchronization signal block (SSB) for a terminal device to perform synchronization, system information acquisition and measurement, etc.

The base station may notify, by means of remaining minimum system information (RMSI) (also known as system information block 1 (SIB1)) and radio resource control (RRC) signaling, the terminal device of which SSBs are actually transmitted by the base station.

However, the RMSI and the RRC may indicate differently in regard to the SSBs actually transmitted by the base station. In this case, according to the different SSB indications, user terminal devices in different states (e.g., connected state and idle state) may have different understandings with respect to physical channel (or physical signal) resource allocation, and may have different understandings with respect to an association relationship between the physical channel (or physical signal) and the actually transmitted SSB according to different SSB indications, thus possibly leading to a waste of resource and increased complexity of system resource configuration.

SUMMARY

An objective of embodiments of the present disclosure is to provide a signal processing method and device, so as to solve the problem that SSBs indicated by RMSI and RRC don't agree with each other.

In a first aspect, an embodiment of the present disclosure provides a signal processing method. The method is applied to a network side device and includes:

transmitting first information via remaining minimum system information RMSI; and/or, transmitting second information via radio resource control RRC signaling;

wherein, SSB related information indicated by the first indication information is at least partially same as SSB related information indicated by the second indication information.

In a second aspect, an embodiment of the present disclosure further provides a signal processing method. The method is applied to a terminal device and includes:

receiving first information via RMSI; and/or, receiving second information via RRC signaling;

wherein, SSB related information indicated by the first indication information is at least partially same as SSB related information indicated by the second indication information.

In a third aspect, an embodiment of the present disclosure further provides a network side device. The network side device includes:

a transmission module, configured to transmit first information via RMSI; and/or, transmit second information via RRC signaling;

wherein, SSB related information indicated by the first indication information is at least partially same as SSB related information indicated by the second indication information.

In a fourth aspect, an embodiment of the present disclosure further provides a terminal device. The terminal device includes:

a reception module, configured to receive first information via RMSI; and/or, receive second information via RRC signaling;

wherein, SSB related information indicated by the first indication information is at least partially same as SSB related information indicated by the second indication information.

In a fifth aspect, an embodiment of the present disclosure further provides a network side device including a processor, a memory and a computer program stored in the memory and configured to be executed by the processor, wherein the processor is configured to execute the computer program to implement steps of the signal processing method as described in the first aspect.

In a sixth aspect, an embodiment of the present disclosure further provides a terminal device including a processor, a memory and a computer program stored in the memory and configured to be executed by the processor, wherein the processor is configured to execute the computer program to implement steps of the signal processing method as described in the second aspect.

In a seventh aspect, an embodiment of the present disclosure further provides a computer readable storage medium storing therein a computer program, wherein the computer program is configured to be executed by a processor to implement steps of the signal processing method as described in the first or second aspect.

According to embodiments of the present disclosure, regarding inter-cell handover, addition or modification of a secondary cell configuration, or addition or modification of a primary secondary cell configuration, SSB related information indicated by the first information transmitted by the network via RMSI is at least partially same as SSB related information indicated by the second information transmitted by the network via RRC signaling, such that terminal devices in different states (e.g., connected state and idle state) may have same understandings with respect to an association relationship between the physical channel (or physical signal) and the SSBs in accordance with SSBs indicated by RMSI and/or RRC, thus avoiding a waste of resource and reducing complexity of system resource configuration.

BRIEF DESCRIPTION OF THE DRAWINGS

By reading the following detailed description of some optional implementations, those of ordinary skill in the art will clearly appreciate other advantages and benefits. The accompany drawings are only for the purpose of illustrating some implementations, and are by no means intended to constitute a limitation on the present disclosure. Further, identical reference characters designate identical parts throughout the drawings.

DETAILED DESCRIPTION

The following describes the technical solutions of the embodiments of the present disclosure clearly with reference to the accompanying drawings in the embodiments of the present disclosure. It is apparent the embodiments in the following description are merely a part rather than all of the embodiments of the present disclosure. All other embodiments obtained by a person of ordinary skill in the art based on the embodiments of the present disclosure without creative efforts shall fall within the scope of the present disclosure.

Terms "include" and any variant thereof in the specification and claims of the present application are intended to cover nonexclusive inclusions. For example, a process, method, system, product or equipment including a series of steps or units is not necessarily limited to those steps or units which are clearly listed, but may include other steps or units which are not clearly listed or intrinsic to the process, the method, the product or the equipment. In addition, the term "and/or" is used in the specification and claims to represent at least one of concatenated objects. For example, A and/or B represents: only A exists, only B exists, and both A and B exist.

In embodiments of the present disclosure, the word "exemplary" or "for example" or the like is used for meaning examples, example illustration or illustration. Any embodiment or design solution described as "exemplary" or "for example" in the embodiments of the present application should not be construed as be more preferred or advantageous than other embodiments or design solutions. To be specific, the word "exemplary" or "for example" or the like is intended to present related concepts in a specific manner.

To provide a better understanding of the technical solution of embodiments of the present disclosure, the following technical features are introduced first.

First. With Respect to SSB Indication

In a NR system, a base station needs to transmit an SSB for a terminal device to perform synchronization, system information acquisition and measurement, etc. Multiple SSBs form a SS burst set. A maximum quantity of SSBs included in one SS burst set is related to the carrier frequency used by the network:

in a case that the carrier frequency is in a range below 3 GHz, one SS burst set may contain up to 4 SSBs;

in a case that the carrier frequency is in a range between 3 GHz and 6 GHz, one SS burst set may contain up to 8 SSBs;

in a case that the carrier frequency is in a range above 6 GHz, one SS burst set may contain up to 64 SSBs.

It is understood that, no matter how many SSBs are contained in one SS burst set, transmission of all SSBs in the SS burst set needs to be completed within a time window of 5 milliseconds (ms). However, a quantity of SSB actually transmitted by a base station within the 5-millisecond time window may be less than a maximum quantity of SSBs allowed in one SS burst set in the frequency band. The base station may notify, by means of RMSI (also known as SIB1) and/or RRC signaling, the terminal device of which SSBs are actually transmitted by the base station.

Information indicating the actually transmitted SSBs in the RRC signaling is designed as follows:

| ssb-PositionsInBurst | CHOICE { |
| --- | --- |
| shortBitmap | BITSTRING (SIZE (4)), |
| mediumBitmap | BITSTRING (SIZE (8)), |
| longBitmap | BITSTRING (SIZE (64)) |
| }. | |

Information indicating the actually transmitted SSBs in the RMSI is designed as follows:

| ssb-PositionsInBurst | SEQUENCE { |
| --- | --- |
| inOneGroup | BITSTRING (SIZE (8)), |
| groupPresence | BITSTRING (SIZE (8)) |
| | OPTIONAL-- Cond above6GHzOnly |
| }. | |

In a frequency band above 6 GHz, when a base station uses RMSI to indicate actually transmitted SSB information, one 8-bit group bitmap and one 8-bit in-group bitmap are used, wherein an SSB group is defined as multiple consecutive SSBs. The group bitmap indicates which SSB groups are actually transmitted (or whether present), and the in-group bitmap indicates which SSBs in the SSB groups are actually transmitted (or whether present), wherein SSBs actually transmitted are same across all groups. For example, for a frequency above 6 GHz, one SS burst set may contain up to 64 SSBs, and the 64 potentially transmitted SSBs are divided into 8 groups. A group bitmap of "11000000" indicates that the base station actually transmits the first SSB group and the second SSB group, and an in-group bitmap of "11110000" indicates that the base station actually transmits the first four SSBs in the first SSB group and the first four SSBs in the second SSB group, thus the base station transmits 2×4=8 SSBs in total.

When the base station notifies, by using RRC signaling, the terminal device of the actually transmitted SSBs, a full bitmap is used. In other words, in a case that one SS burst set contains up to L SSBs (L=4/8/64), a bitmap with a size L is used to indicate which SSBs are actually transmitted.

Second. With Respect to an Association Relationship Between an SSB and a Physical Random Access Channel Transmission Occasion (PRACH Transmission Occasion, or PRACH Occasion, RO)

In the NR system, the association relationship between an SSB and an RO refers to that there is a mapping between an SSB and an RO. The mapping may be a one-to-one, one-to-many, or many-to-one mapping. An example of the association relationship is: two SSBs are mapped to RO resources, and each RO has one SSB mapped thereto. Assuming that two SSBs having an association relationship with an RO are SSB0 and SSB1, for a single mapping between SSB and RO, the SSB0 and SSB1 are mapped to two different ROs respectively. The terminal device may determine the association relationship between an SSB and an RO according to SSBs indicated in RRC and/or RMSI and a PRACH configuration.

Figure 1:
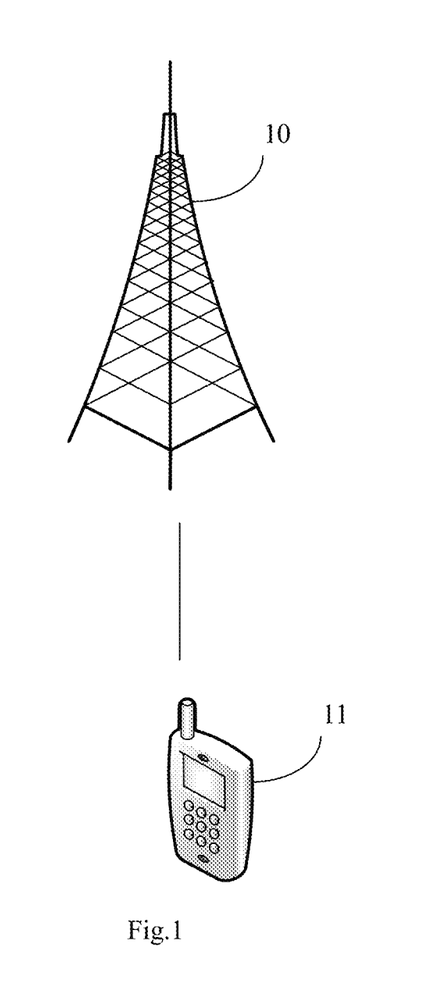
FIG. 1 is a schematic diagram of an architecture of a wireless communication system according to an embodiment of the present disclosure.

Embodiments of the present disclosure are described hereinafter with reference to accompanying drawings. The signal processing method and device according to embodiments of the present disclosure may be applied to a wireless communication system. The wireless communication system may be a fifth generation mobile communication technology (5G) system, an evolved long term evolution (eLTE) system, or a subsequent evolved communication system. Referring to FIG. 1, a schematic diagram of an architecture of a wireless communication system according to an embodiment of the present disclosure is illustrated. As shown in FIG. 1, the wireless communication system may include: a network side device 10 and a terminal device (e.g., user equipment (UE)). For example, the terminal device is denoted as a UE 11. The UE 11 may be in communication with the network side device 10 (signaling transmission or data transmission). In a practical application, a connection between the various devices may be a wireless connection, which is depicted with a solid line in FIG. 1 to facilitate an intuitive representation of a connection relationship between various devices.

It is noted, the communication system may include multiple UEs 11, and the network side device 10 may communicate with the multiple UEs 11.

The network side device 10 according to the embodiment of the present disclosure may be a base station. The base station may be a commonly used base station, an evolved node base station (eNB), or a network side device in a 5G system (e.g., next generation node base station (gNB) or transmission and reception point (TRP)), among other devices.

The user equipment according to the embodiment of the present disclosure may be a cellphone, a tablet computer, a notebook computer, an ultra-mobile personal computer (UMPC), a netbook, a personal digital assistant (PDA), or the like.

Figure 2:
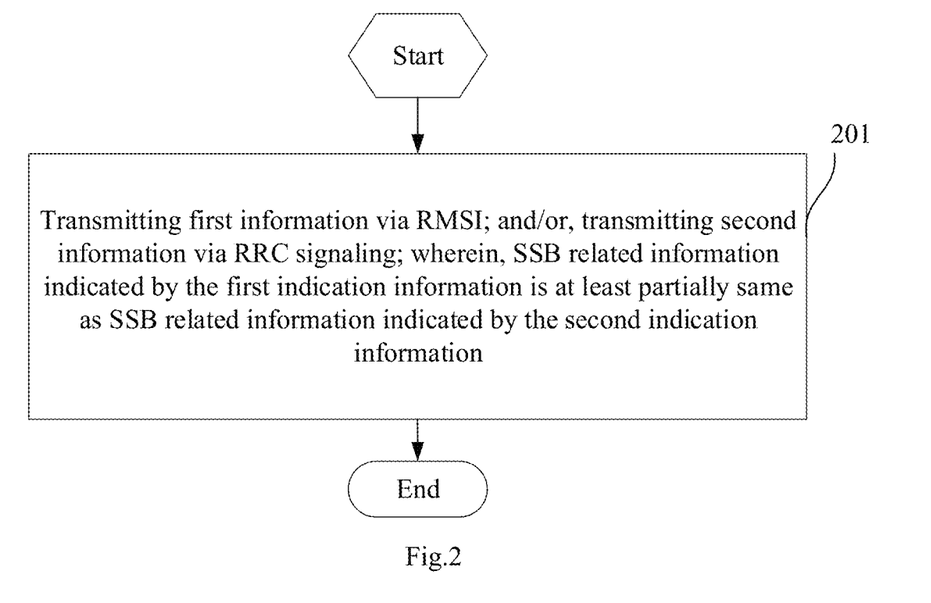
FIG. 2 is a first flow diagram of a signal processing method according to an embodiment of the present disclosure.

Referring to FIG. 2, an embodiment of the present disclosure provides a signal processing method. The method is performed by a network side device and includes the following specific step:

Step 201: transmitting first information via RMSI; and/or, transmitting second information via RRC signaling;

wherein, SSB related information indicated by the first indication information is at least partially same as SSB related information indicated by the second indication information. Optionally, SSB related information indicated by the first indication information and SSB related information indicated by the second indication information are identical. According to the embodiment of the present disclosure, the network side may ensure and/or the terminal device anticipates (assumes) that SSB related information indicated by the first indication information and SSB related information indicated by the second indication information are identical.

For example, the first indication information and the second indication information indicate a time position of a transmitted SSB in the burst set, wherein the time position of the transmitted SSB is used in rate matching (rate matching); or the first indication information and the second indication information indicate an SSB having an association relationship with an RO, wherein the indicated SSBs are used in an association relationship between SSBs and ROs.

According to the embodiment of the present disclosure, since SSB related information indicated by the first indication information is at least partially same as SSB related information indicated by the second indication information, the terminal device may determine content indicated by the second indication information on the basis of the first indication information, or determine content indicated by the first indication information on the basis of the second indication information, such that terminal devices in different states (e.g., connected state and idle state) have same understandings with respect to SSBs indicated by RMSI and/or RRC.

It is understood, SSB related information indicated by the first indication information and SSB related information indicated by the second indication information are the same, or have a certain mapping relationship therebetween, or have a derivation rule; that is, SSB related information indicated by the first indication information is derived from SSB related information indicated by the second indication information, or SSB related information indicated by the second indication information is derived from SSB related information indicated by the first indication information.

In an embodiment of the present disclosure, the first information and the second information may have the same format. It is understood, the same format adopted by the first and second information is not limited specifically.

In an embodiment of the present disclosure, optionally, the first information may indicate at least one of following: a first time position of an SSB transmitted in a burst set, and a first SSB having an association relationship with a physical random access channel transmission occasion RO;

the second information indicates at least one of following: a second time position of an SSB transmitted in the burst set, and a second SSB having an association relationship with an RO, wherein, the first time position is at least partially same as the second time position, and/or, the first SSB is at least partially same as the second SSB.

For example, the first information may include one or more of: a parameter a, a parameter b and a parameter c, wherein the parameter a indicates a first time position of an SSB transmitted in a burst set, the parameter b indicates a first SSB having an association relationship with a physical random access channel transmission occasion RO, the parameter c indicates a first time position of an SSB transmitted in a burst set and a first SSB having an association relationship with a physical random access channel transmission occasion RO.

For example, the second information may include one or more of: a parameter d, a parameter e and a parameter f, wherein the parameter d indicates a first time position of an SSB transmitted in a burst set, the parameter e indicates a first SSB having an association relationship with a physical random access channel transmission occasion RO, the parameter f indicates a first time position of an SSB transmitted in a burst set and a first SSB having an association relationship with a physical random access channel transmission occasion RO.

Further, for example, the first information includes the parameter c and the second information includes the parameter d and the parameter e, the network side ensures that the parameter c and the parameter e are identical. Or, the first information includes the parameter c and the second information includes the parameter f, the network side ensures that the parameter c and the parameter f are identical.

It is understood, the first time position and the second time position are at least partially the same, or there is a mapping between at least part of said first time position and at least part of said second time position, or the first time position and the second time position at least partially have a derivation rule; that is, at least a part of the second time position is derived from at least a part of the first time position, or at least a part of the first time position is derived from at least a part of the second time position.

It is understood, the first SSB and the second SSB are at least partially the same, or the first SSB and the second SSB at least partially have a certain mapping relationship therebetween, or the first SSB and the second SSB at least partially have a derivation rule; that is, at least a part of the second SSB is derived from at least a part of the first SSB, or at least a part of the first SSB is derived from at least a part of the second SSB.

In an embodiment of the present disclosure, optionally, the first information and the second information are positions of synchronization signal blocks in the burst set (SSB-PositionsInBurst) parameter or another parameter indicating SSB time-domain transmission positions. It is understood, the form of the first information and the second information is not limited specifically.

In an embodiment of the present disclosure, optionally, in the step 201, the first information is transmitted via RMSI of a target cell, a secondary cell (Scell) or a primary secondary cell (PScell); or, the second information of a target cell, a secondary cell or a primary secondary cell is transmitted via RRC signaling. For example, regarding inter-cell handover, the second information of the target cell is transmitted by a source cell via RRC signaling. For another example, regarding addition or modification of a serving cell, the second information of the secondary cell or the primary secondary cell is transmitted by an added or modified serving cell via RRC signaling.

In an embodiment of the present disclosure, optionally, regarding inter-cell handover, the first information is transmitted by a target cell, and the second information is transmitted by a source cell; or, regarding addition or modification of a serving cell, the first information is transmitted by an added or modified serving cell, and the second information is transmitted by a primary cell, which may specifically include: (1) regarding addition or modification of a secondary cell configuration, the first information is transmitted by the secondary cell and the second information is transmitted by a primary cell; (2) regarding addition or modification of a primary secondary cell configuration, the first information is transmitted by the primary secondary cell and the second information is transmitted by a primary cell. Regarding the inter-cell handover or addition or modification of the serving cell, optionally, SSB related information indicated by the first information and SSB related information indicated by the second information may be all the same. For example, when an inter-cell handover and serving cell addition (HOAndServCellAdd) condition exists, SSB related information indicated by the first information and SSB related information indicated by the second information may be all the same.

In the embodiments of the present disclosure, regarding inter-cell handover, addition or modification of a secondary cell configuration, or addition or modification of a primary secondary cell configuration, the network may ensure that SSB related information indicated by the first information transmitted via RMSI is at least partially same as SSB related information indicated by the second information transmitted via RRC signaling, such that terminal devices in different states (e.g., connected state and idle state) may have same understandings with respect to an association relationship between the physical channel (or physical signal) and the SSBs in accordance with SSBs indicated by RMSI and/or RRC, thus avoiding a waste of resource and reducing complexity of system resource configuration.

Figure 3:
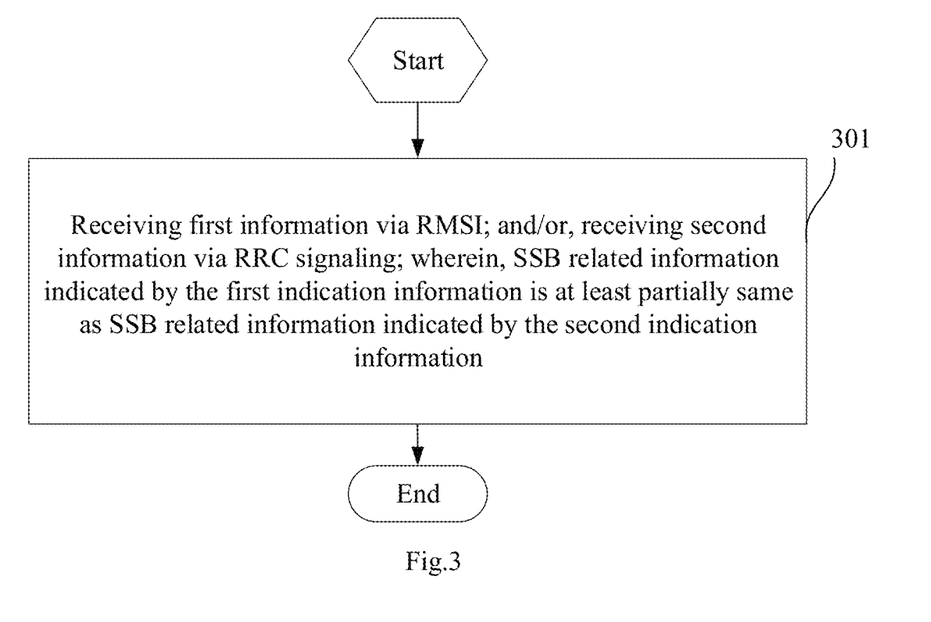
FIG. 3 is a second flow diagram of a signal processing method according to an embodiment of the present disclosure.

Referring to FIG. 3, an embodiment of the present disclosure further provides a signal processing method. The method is performed by a terminal device and includes the following specific step:

Step 301: receiving first information via RMSI; and/or, receiving second information via RRC signaling;

wherein, SSB related information indicated by the first indication information is at least partially same as SSB related information indicated by the second indication information. Optionally, SSB related information indicated by the first indication information and SSB related information indicated by the second indication information are all the same. According to the embodiment of the present disclosure, the network side may ensure and/or the terminal device anticipates (assumes) that SSB related information indicated by the first indication information and SSB related information indicated by the second indication information are all the same. For example, the first indication information and the second indication information indicate a time position of a transmitted SSB in the burst set, wherein the time position of the transmitted SSB is used in rate matching (rate matching); or the first indication information and the second indication information indicate an SSB having an association relationship with an RO, wherein the indicated SSBs are used in an association relationship between SSBs and ROs.

According to the embodiment of the present disclosure, since SSB related information indicated by the first indication information is at least partially same as SSB related information indicated by the second indication information, the terminal device may determine content indicated by the second indication information on the basis of the first indication information, or determine content indicated by the first indication information on the basis of the second indication information, such that terminal devices in different states (e.g., connected state and idle state) have same understandings with respect to SSBs indicated by RMSI and/or RRC.

It is understood, SSB related information indicated by the first indication information and SSB related information indicated by the second indication information are the same, or have a certain mapping relationship therebetween, or have a derivation rule; that is, SSB related information indicated by the first indication information is derived from SSB related information indicated by the second indication information, or SSB related information indicated by the second indication information is derived from SSB related information indicated by the first indication information.

In an embodiment of the present disclosure, the first information and the second information may have the same format. It is understood, the same format adopted by the first and second information is not limited specifically.

In an embodiment of the present disclosure, optionally, the first information may indicate at least one of following: a first time position of an SSB transmitted in a burst set, and a first SSB having an association relationship with a physical random access channel transmission occasion RO;

the second information indicates at least one of following: a second time position of an SSB transmitted in the burst set, and a second SSB having an association relationship with an RO, wherein, the first time position is at least partially same as the second time position, and/or, the first SSB is at least partially same as the second SSB.

It is understood, the first time position and the second time position are at least partially the same, or the first time position and the second time position at least partially have a certain mapping relationship therebetween, or the first time position and the second time position at least partially have a derivation rule; that is, at least a part of the second time position is derived from at least a part of the first time position, or at least a part of the first time position is derived from at least a part of the second time position.

It is understood, the first SSB and the second SSB are at least partially the same, or there is a mapping between at least part of said first SSB and at least part of said second SSB, or the first SSB and the second SSB at least partially have a derivation rule; that is, at least a part of the second SSB is derived from at least a part of the first SSB, or at least a part of the first SSB is derived from at least a part of the second SSB.

In an embodiment of the present disclosure, optionally, the first information and the second information are SSB-PositionsInBurst parameters or other parameters indicating SSB time-domain transmission positions. It is understood, the form of the first information and the second information is not limited specifically.

In an embodiment of the present disclosure, optionally, in the step 301, the first information is received via RMSI of a target cell, a secondary cell or a primary secondary cell; or, the second information of a target cell, a secondary cell or a primary secondary cell is received via RRC signaling.

In an embodiment of the present disclosure, optionally, regarding inter-cell handover, the first information is transmitted by a target cell, and the second information is transmitted by a source cell; or, regarding addition or modification of a serving cell, the first information is transmitted by an added or modified serving cell, and the second information is transmitted by a primary cell, which may specifically include: (1) regarding addition or modification of a secondary cell configuration, the first information is transmitted by the secondary cell and the second information is transmitted by a primary cell; (2) regarding addition or modification of a primary secondary cell configuration, the first information is transmitted by the primary secondary cell and the second information is transmitted by a primary cell. Regarding the inter-cell handover or addition or modification of the serving cell, optionally, SSB related information indicated by the first and SSB related information indicated by the second information may be identical. For example, when a HOAndServCellAdd condition exists, SSB related information indicated by the first and SSB related information indicated by the second information may be identical.

In the embodiments of the present disclosure, regarding inter-cell handover, addition or modification of a secondary cell configuration, or addition or modification of a primary secondary cell configuration, the network may ensure that SSB related information indicated by the first information transmitted via RMSI is at least partially same as SSB related information indicated by the second information transmitted via RRC signaling, such that terminal devices in different states (e.g., connected state and idle state) may have same understandings with respect to an association relationship between the physical channel (or physical signal) and the SSBs in accordance with SSBs indicated by RMSI and/or RRC, thus avoiding a waste of resource and reducing complexity of system resource configuration.

It is understood, the embodiments of the present disclosure may solve problems occurring in the following scenarios.

Scenario 1: During inter-cell handover, ssb-PositionsInBurst associated with a target cell and carried in signaling of a current serving cell (e.g., source cell) is different from ssb-PositionsInBurst in RMSI of the target cell.

Scenario 2: During Scell configuration addition or modification, ssb-PositionsInBurst associated with a secondary cell (Scell) and carried in signaling of a current serving cell (e.g., primary cell) is different from ssb-PositionsInBurst in RMSI of the Scell.

Scenario 3: During primary secondary cell (PScell) configuration addition or modification, ssb-PositionsInBurst associated with a PScell and carried in signaling of a current serving cell (e.g., primary cell) is different from ssb-PositionsInBurst in RMSI of the PScell.

As for the above scenarios, according to the embodiments of the present disclosure, it can be ensured that ssb-PositionsInBurst of a target cell, Scell or PScell carried in signaling of a current serving cell is identical to ssb-PositionsInBurst in RMSI of the target cell, Scell or PScell.

Example 1

In this example, a case in which the first information and the second information are ssb-PositionsInBurst parameters is introduced. It is understood, a specific form of the first information and the second information is not specifically limited in the embodiments of the present disclosure.

During inter-cell handover, Scell configuration addition or modification, or PScell configuration addition or modification, the base station ensures that SSBs indicated by the ssb-PositionsInBurst in the common serving cell configuration (ServingCellConfigCommon) for the target cell, Scell or PScell in the RRC configuration are all the same as SSBs indicated by the ssb-PositionsInBurst in the SIB1 of the target cell, Scell or PScell.

For example, for a frequency above 6 GHz, one SS burst set may contain up to 64 SSBs, and the 64 potentially transmitted SSBs are divided into 8 groups. In an inter-cell handover scenario, it is assumed that, in the ssb-PositionsInBurst in the RMSI of a target cell A, a group bitmap is "11000000" which indicates the first SSB group and the second SSB group, and an in-group bitmap is "11000000" which indicates the first two SSBs in the first SSB group and the first two SSBs in the second SSB group, then the base station transmits 2×2=4 SSBs in total. It is assumed that the 4 SSBs are labeled as SSB0, SSB1, SSB8 and SSB9. Considering that configuration of the target cell A is configured in the RRC configuration (e.g., ReconfigurationWithSync) of a source cell B during inter-cell handover, the ssb-PositionsInBurst in the ServingCellConfigCommon configured by the network also indicates SSB0, SSB1, SSB8 and SSB9 at this time. The terminal device establishes an association relationship between SSBs and ROs on the basis of SSB0, SSB1, SSB8 and SSB9, and performs rate matching on the basis of SSB0, SSB1, SSB8 and SSB9.

For another example, for a frequency above 6 GHz, one SS burst set may contain up to 64 SSBs, and the 64 potentially transmitted SSBs are divided into 8 groups. The Pcell configures, by signaling, a cell A as a secondary cell newly added for a user. It is assumed that the cell A is also transmitting RMSI of the cell A, and in the ssb-PositionsIn- Burst in the RMSI (SIB1), a group bitmap is "11000000" which indicates the first SSB group and the second SSB group, and an in-group bitmap is "11000000" which indicates the first two SSBs in the first SSB group and the first two SSBs in the second SSB group, then a total of 2×2=4 SSBs are transmitted. It is assumed that the 4 SSBs are labeled as SSB0, SSB1, SSB8 and SSB9. In this case, the network needs to ensure that ssb-PositionsInBurst in the configuration (e.g., ServingCellConfigCommon) for the secondary cell A in the signaling transmitted by the primary cell also indicates SSB0, SSB1, SSB8 and SSB9. The terminal device establishes an association relationship between SSBs and ROs on the basis of SSB0, SSB1, SSB8 and SSB9, and performs rate matching on the basis of SSB0, SSB1, SSB8 and SSB9.

For yet another example, for a frequency above 6 GHz, one SS burst set may contain up to 64 SSBs, and the 64 potentially transmitted SSBs are divided into 8 groups. The Pcell configures, by signaling, a cell A as a primary secondary cell for a user. It is assumed that the cell A is also transmitting RMSI of the cell A, and in the ssb-PositionsInBurst in the RMSI (SIB1), a group bitmap is "11000000" which indicates the first SSB group and the second SSB group, and an in-group bitmap is "11000000" which indicates the first two SSBs in the first SSB group and the first two SSBs in the second SSB group, then a total of 2×2=4 SSBs are transmitted. It is assumed that the 4 SSBs are labeled as SSB0, SSB1, SSB8 and SSB9. In this case, the network needs to ensure that ssb-PositionsInBurst in the configuration (e.g., ServingCellConfigCommon) for the primary secondary cell A in the signaling transmitted by the primary cell also indicates SSB0, SSB1, SSB8 and SSB9. The terminal device establishes an association relationship between SSBs and ROs on the basis of SSB0, SSB1, SSB8 and SSB9, and performs rate matching on the basis of SSB0, SSB1, SSB8 and SSB9.

An embodiment of the present disclosure further provides a network side device. Since a principle in which the network side device solves problems is similar to the signal processing method according to the embodiment of the present disclosure, for a description of the implementation of the network side device, references may be made to the implementation of the signal processing method and a repeated description is omitted herein.

Figure 4:
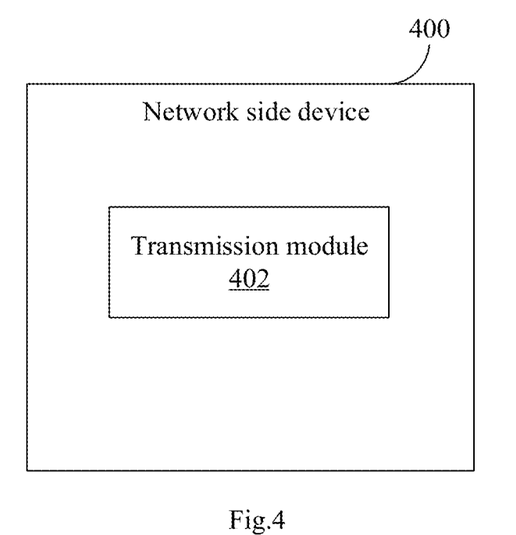
FIG. 4 is a first structural diagram of a network side device according to an embodiment of the present disclosure.

Referring to FIG. 4, an embodiment of the present disclosure further provides a network side device. The network side device 400 includes: a transmission module 401, configured to transmit first information via remaining minimum system information RMSI; and/or, transmit second information via radio resource control RRC signaling; wherein, SSB related information indicated by the first indication information is at least partially same as SSB related information indicated by the second indication information.

In an embodiment of the present disclosure, optionally, the first information indicates at least one of following: a first time position of an SSB transmitted in a burst set, and a first SSB having an association relationship with a physical random access channel transmission occasion RO; the second information indicates at least one of following: a second time position of an SSB transmitted in the burst set, and a second SSB having an association relationship with an RO, wherein, the first time position is at least partially same as the second time position, and/or, the first SSB is at least partially same as the second SSB.

In an embodiment of the present disclosure, optionally, the first information and the second information are positions of synchronization signal blocks in the burst set SSB-PositionsInBurst parameters or other parameters indicating SSB time-domain transmission positions.

In an embodiment of the present disclosure, optionally, the transmission module 401 is further configured to: transmit the first information via RMSI of a target cell, a secondary cell or a primary secondary cell, and/or, transmit the second information of a target cell, a secondary cell or a primary secondary cell via RRC signaling.

In an embodiment of the present disclosure, optionally, regarding inter-cell handover, the first information is transmitted by a target cell, and the second information is transmitted by a source cell; or, regarding addition or modification of a serving cell, the first information is transmitted by an added or modified serving cell, and the second information is transmitted by a primary cell, which may specifically include: (1) regarding addition or modification of a secondary cell configuration, the first information is transmitted by the secondary cell and the second information is transmitted by a primary cell; (2) regarding addition or modification of a primary secondary cell configuration, the first information is transmitted by the primary secondary cell and the second information is transmitted by a primary cell.

The network side device provided in the embodiment of the present disclosure may implement the foregoing method embodiments in a similar implementation principle and with similar technical effects. A detailed description thereof is omitted in this embodiment.

An embodiment of the present disclosure further provides a terminal device. Since a principle in which the terminal device solves problems is similar to the signal processing method according to the embodiment of the present disclosure, for a description of the implementation of the terminal device, references may be made to the implementation of the signal processing method and a repeated description is omitted herein.

Figure 5:
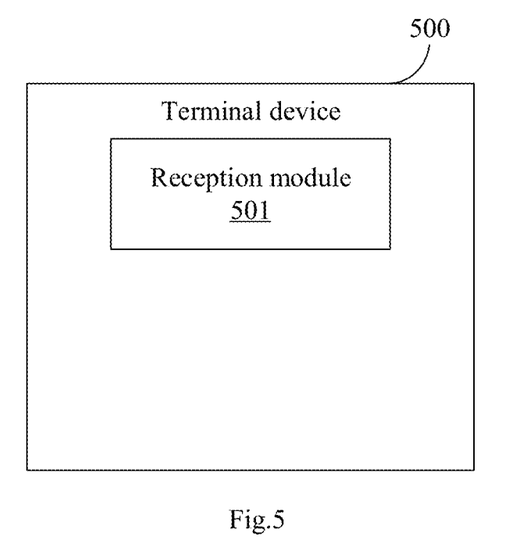
FIG. 5 is a first structural diagram of a terminal device according to an embodiment of the present disclosure.

Referring to FIG. 5, an embodiment of the present disclosure further provides a terminal device. The terminal device 500 includes: a reception module 501, configured to receive first information via RMSI; and/or, receive second information via RRC signaling; wherein, SSB related information indicated by the first indication information is at least partially same as SSB related information indicated by the second indication information.

In an embodiment of the present disclosure, optionally, the first information indicates at least one of following: a first time position of an SSB transmitted in a burst set, and a first SSB having an association relationship with a physical random access channel transmission occasion RO;

the second information indicates at least one of following: a second time position of an SSB transmitted in the burst set, and a second SSB having an association relationship with an RO, wherein, the first time position is at least partially same as the second time position, and/or, the first SSB is at least partially same as the second SSB.

In an embodiment of the present disclosure, optionally, the first information and the second information are SSB-PositionsInBurst parameters or other parameters indicating SSB time-domain transmission positions.

In an embodiment of the present disclosure, optionally, the reception module 501 is further configured to: receive the first information via RMSI of a target cell, a secondary cell or a primary secondary cell; and/or, receive second information of a target cell, a secondary cell or a primary secondary cell via RRC signaling.

In an embodiment of the present disclosure, optionally, regarding inter-cell handover, the first information is transmitted by a target cell, and the second information is transmitted by a source cell; or, regarding addition or modification of a serving cell, the first information is transmitted by an added or modified serving cell, and the second information is transmitted by a primary cell, which may specifically include: (1) regarding addition or modification of a secondary cell configuration, the first information is transmitted by the secondary cell and the second information is transmitted by a primary cell; (2) regarding addition or modification of a primary secondary cell configuration, the first information is transmitted by the primary secondary cell and the second information is transmitted by a primary cell.

The terminal device provided in the embodiment of the present disclosure may implement the foregoing method embodiments in a similar implementation principle and with similar technical effects. A detailed description thereof is omitted in this embodiment.

Figure 6:
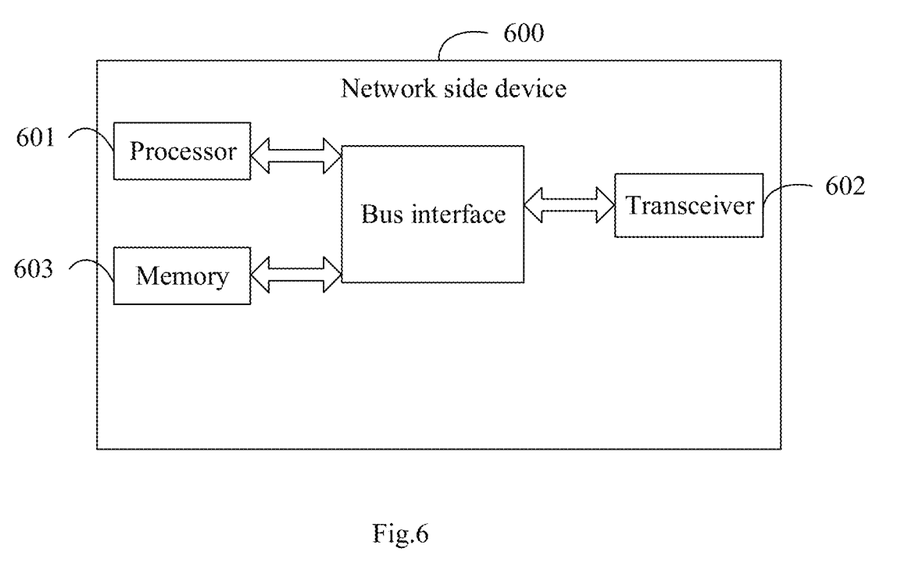
FIG. 6 is a second structural diagram of a network side device according to an embodiment of the present disclosure.

Referring to FIG. 6, a structural diagram of a network side device to which embodiments of the present disclosure are applicable is illustrated. As shown in FIG. 6, the network side device 600 includes: a processor 601, a transceiver 602, a memory 603 and a bus interface.

In an embodiment of the present disclosure, the network side device 600 further includes a computer program stored in the memory 603 and configured to be executed by a processor 601, wherein the processor 601 is configured to execute the computer program to implement the following steps: transmitting first information via remaining minimum system information RMSI; and/or, transmitting second information via radio resource control RRC signaling; wherein, SSB related information indicated by the first indication information is at least partially same as SSB related information indicated by the second indication information.

In FIG. 6, a bus architecture may include any quantity of interconnected buses and bridges, and connects various circuits including one or more processors represented by the processor 601 and a memory represented by the memory 603. The bus architecture may also connect various other circuits such as peripherals, voltage regulators and power management circuits, which is well known in the art. Therefore, a detailed description thereof is omitted herein. The bus interface provides interfaces. The transceiver 602 may be multiple elements, such as a transmitter and a receiver, to provide units for communicating with various other apparatuses on the transmission medium.

The processor 601 is responsible for supervising the bus architecture and normal operation and the memory 603 may store the data being used by the processor 601 during operation.

The network side device provided in the embodiment of the present disclosure may implement the foregoing method embodiments in a similar implementation principle and with similar technical effects. A detailed description thereof is omitted in this embodiment.

Figure 7:
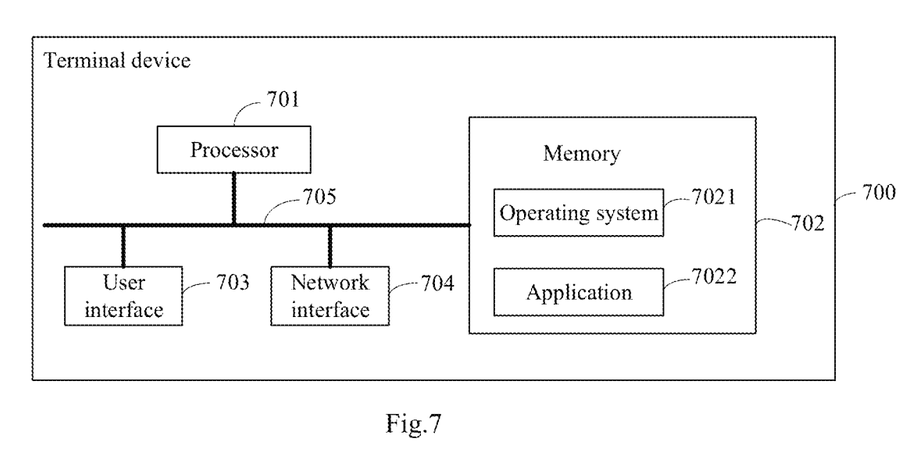
FIG. 7 is a second structural diagram of a terminal device according to an embodiment of the present disclosure.

As shown in FIG. 7, the terminal device 700 as shown in FIG. 7 includes: at least one processor 701, a memory 702, at least one network interface 704, and a user interface 703. The various components in the terminal device 700 are coupled together by a bus system 705. It may be understood that the bus system 705 is configured to implement connection and communication among these components. The bus system 705 further includes a power bus, a control bus, and a status signal bus in addition to a data bus. However, for clarity of description, various buses in FIG. 7 are all labeled as the bus system 705.

The user interface 703 may include a display, a keyboard or a point-and-click device (for example, a mouse, a trackball, a touch pad, a touch screen, or the like).

It may be understood that the memory 702 in the embodiment of the present disclosure may be a volatile memory or a nonvolatile memory, or may include both a volatile memory and a nonvolatile memory. The nonvolatile memory may be a read-only memory (ROM), a programmable ROM (PROM), an erasable programmable PROM (EPROM), an electrically EPROM (EEPROM) or a flash memory. The volatile memory may be a random access memory (RAM), which is used as an external cache. By way of example rather than limitation, many forms of RAMs such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct Rambus RAM (DRRAM) may be used. The memory 702 in the system and method described in embodiments of the present disclosure is intended to include, but is not limited to, these and any other appropriate types of memories.

In some implementations, the memory 702 stores executable modules or data structures, or a subset thereof, or an extended set thereof, for example, an operating system 7021 and an application 7022.

The operating system 7021 includes various system programs, such as a framework layer program, a core library layer program, and a driver layer program, to implement various basic services and process a hardware-based task. The application 7022 includes various applications such as a media player or a browser (Browser), to implement various application services. A program for implementing the method provided in embodiments of the present disclosure may be included in the application 7022.

In an embodiment of the present disclosure, by invoking and executing a program or instructions stored in the memory 702, specifically the program or instructions stored in the application 7022, the following steps are implemented: receiving first information via RMSI; and/or, receiving second information via RRC signaling; wherein, SSB related information indicated by the first indication information is at least partially same as SSB related information indicated by the second indication information.

The terminal device provided in the embodiment of the present disclosure may implement the foregoing method embodiments in a similar implementation principle and with similar technical effects. A detailed description thereof is omitted in this embodiment.

Steps of the method or algorithm described in this disclosure may be implemented in form of hardware, or in form of software instructions executable by a processor. The software instructions may be composed of corresponding software modules, and the software modules may be stored in an RAM, flash memory, ROM, EPROM, EEPROM, register, hard disk, removable hard disk, read-only optic disc or any other form of storage medium well known in the art. An exemplary storage medium is coupled to a processor, so that the processor may read information from the storage medium and write information to the storage medium. Certainly, the storage medium may be a part of the processor. The processor and the storage medium may reside in an ASIC. Further, the ASIC may reside in a core network interface device. Certainly, the processor and the storage medium may reside in the core network interface device as discrete components.

It is understood by a person skilled in the art that, in one or more of foregoing examples, the functions described in the present disclosure may be implemented by hardware, software, firmware or a combination thereof. When implemented in software, the functions may be stored in a computer readable medium, or transmitted as one or more instructions or codes on a computer readable medium. The computer readable medium includes a computer storage medium and a communication medium, wherein the communication medium includes any medium suitable for transporting a computer program from one place to another. The storage medium may be any available medium accessible by a general purpose or special purpose computer.

The objectives, technical solutions and beneficial effects of the present disclosure are described in detail hereinafter with respect to specific implementations. It is understood, the foregoing description merely illustrate specific implementations of the present disclosure, but the scope of the disclosure is by no means limited thereto. Any modification, equivalent replacement, improvement made on the basis of the technical solution of the present disclosure shall fall within the scope of the present disclosure.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer usable storage media (including, but not limited to, a magnetic disk storage, CD-ROM, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, when executed via the processor of the computer or other programmable data processing terminal device, create means for implementing the functions specified in one or more flows of the flow diagram and/or one or more blocks of the block diagram.

These computer program instructions may also be stored in a computer-readable storage that can direct a computer or other programmable data processing terminal device to function in a particular manner, such that the instructions stored in the computer-readable storage produce an article of manufacture including instruction means which implement the function specified in one or more flows of the flow diagram and/or one or more blocks of the block diagram.

The computer program instructions may also be loaded to a computer or other programmable data processing device to cause a series of operational steps to be performed on the computer or other programmable terminal device, to produce a computer-implemented process, such that the instructions which are executed on the computer or other programmable device provide steps for implementing the functions specified in one or more flows of the flow diagram and/or one or more blocks of the block diagram.

Apparently, a person skilled in the art may make various modifications and variants to the embodiments of the present disclosure without departing from the spirit and scope of the present disclosure. In case that these modifications and variants to the embodiments of the present disclosure fall within the scope of the claims of the present disclosure and its equivalents, these modifications and variants are also intended to be encompassed in the present disclosure.

What is claimed is:

1. A signal processing method, applied to a terminal device, comprising:
   receiving first information via RMSI; and,
   receiving second information via RRC signaling;
   wherein, SSB related information indicated by the first information is same as SSB related information indicated by the second information;
   the first information comprises a group bitmap and an in-group bitmap;
   each bit in the group bitmap corresponds to a respective one SSB group;
   starting from a first one of the bits in the group bitmap in an order from left to right, an nth bits in the group bitmap correspond to an nth SSB group;
   each bit in the in-group bitmap corresponds to a respective one SSB in the SSB group;
   starting from a first one of the bits in the in-group bitmap in the order from left to right, an mth bit in the in-group bitmap correspond to an mth SSB in the SSB group;
   the second information comprises a full bitmap.

2. The signal processing method according to claim 1, wherein,
   the first information indicates at least one of following: a first time position of an SSB transmitted in a burst set, and a first SSB having an association relationship with a physical random access channel transmission occasion RO;
   the second information indicates at least one of following: a second time position of an SSB transmitted in the burst set, and a second SSB having an association relationship with the RO,
   wherein, the first time position is at least partially same as the second time position, and/or, the first SSB is at least partially same as the second SSB.

3. The signal processing method according to claim 1, wherein the first information and the second information are SSB-PositionsInBurst parameters or other parameters indicating SSB time-domain transmission positions.

4. The signal processing method according to claim 1, wherein,
   the receiving first information via RMSI comprises:
   receiving the first information via RMSI of a target cell, a secondary cell or a primary secondary cell;
   the receiving second information via RRC signaling comprises:
   receiving second information of a target cell, a secondary cell or a primary secondary cell via the RRC signaling.

5. The signal processing method according to claim 1, wherein,
   regarding inter-cell handover, the first information is transmitted by a target cell, and the second information is transmitted by a source cell; or,
   regarding addition or modification of a serving cell, the first information is transmitted by an added or modified serving cell, and the second information is transmitted by a primary cell.

6. The signal processing method according to claim 1, wherein a SS burst set comprises up to 64 SSBs, the 64 SSBs are divided into 8 SSB groups, and each of the 8 SSB groups comprises 8 SSBs;
each bit in the group bitmap corresponds to a respective one of the 8 SSB groups;
each bit in the in-group bitmap corresponds to a respective SSB in one of the eight SSB groups.

7. The signal processing method according to claim 6, wherein
starting from the first one of the bits in the group bitmap in the order from left to right, the bits in the group bitmap correspond to the 8 SSB groups, respectively;
starting from the first one of the bits in the in-group bitmap in the order from left to right, the bits in the in-group bitmap correspond to the 8 SSBs in the SSB group, respectively.

8. A network side device, comprising: a processor, a memory and a computer program stored in the memory and configured to be executed by the processor, wherein the processor is configured to execute the computer program to:
transmit first information via remaining minimum system information RMSI; and, transmit second information via radio resource control RRC signaling;
wherein, SSB related information indicated by the first information is same as SSB related information indicated by the second information;
the first information comprises a group bitmap and an in-group bitmap;
each bit in the group bitmap corresponds to a respective one SSB group;
starting from a first one of the bits in the in-group bitmap in an order from left to right, an nth bits in the group bitmap correspond to an nth SSB group;
each bit in the in-group bitmap corresponds to a respective one SSB in the SSE group;
starting from a first one of the bits in the in-group bitmap in the order from left to right, an mth bit in the in-group bitmap correspond to an mth SSB in the SSB group;
the second information comprises a full bitmap.

9. The network side device according to claim 8, wherein, the first information indicates at least one of following: a first time position of an SSB transmitted in a burst set, and a first SSB having an association relationship with a physical random access channel transmission occasion RO;
the second information indicates at least one of following: a second time position of an SSB transmitted in the burst set, and a second SSB having an association relationship with the RO,
wherein, the first time position is at least partially same as the second time position, and/or, the first SSB is at least partially same as the second SSB.

10. The network side device according to claim 8, wherein the first information and the second information are positions of synchronization signal blocks in the burst set SSB-PositionsInBurst parameters or other parameters indicating SSB time-domain transmission positions.

11. The network side device according to claim 8, wherein the processor is further configured to execute the computer program to:
transmit the first information via RMSI of a target cell, a secondary cell or a primary secondary cell; or,
transmit the second information of a target cell, a secondary cell or a primary secondary cell via the RRC signaling.

12. The network side device according to claim 8, wherein,
regarding inter-cell handover, the first information is transmitted by a target cell, and the second information is transmitted by a source cell; or,
regarding addition or modification of a serving cell, the first information is transmitted by an added or modified serving cell, and the second information is transmitted by a primary cell.

13. A terminal device, comprising: a processor, a memory and a computer program stored in the memory and configured to be executed by the processor, wherein the processor is configured to execute the computer program to:
receive first information via RMSI; and,
receive second information via RRC signaling;
wherein, SSB related information indicated by the first information is same as SSB related information indicated by the second information;
the first information comprises a group bitmap and an in-group bitmap;
each bit in the group bitmap corresponds to a respective one SSB group;
starting from a first one of the bits in the group bitmap in an order from left to right, an nth bits in the group bitmap correspond to an nth SSB group;
each bit in the in-group bitmap corresponds to a respective one SSB in the SSB group;
starting from a first one of the bits in the in-group bitmap in the order from left to right, an mth bit in the in-group bitmap correspond to an mth SSB in the SSB group;
the second information comprises a full bitmap.

14. The terminal device according to claim 13, wherein, the first information indicates at least one of following: a first time position of an SSB transmitted in a burst set, and a first SSB having an association relationship with a physical random access channel transmission occasion RO;
the second information indicates at least one of following: a second time position of an SSB transmitted in the burst set, and a second SSB having an association relationship with the RO,
wherein, the first time position is at least partially same as the second time position, and/or, the first SSB is at least partially same as the second SSB.

15. The terminal device according to claim 13, wherein the first information and the second information are SSB-PositionsInBurst parameters or other parameters indicating SSB time-domain transmission positions.

16. The terminal device according to claim 13, wherein the processor is further configured to execute the computer program to:
receive the first information via RMSI of a target cell, a secondary cell or a primary secondary cell; or,
receive second information of a target cell, a secondary cell or a primary secondary cell via the RRC signaling.

17. The terminal device according to claim 13, wherein regarding inter-cell handover, the first information is transmitted by a target cell, and the second information is transmitted by a source cell; or,
regarding addition or modification of a serving cell, the first information is transmitted by an added or modified serving cell, and the second information is transmitted by a primary cell.

18. The terminal device according to claim 13, wherein a SS burst set comprises up to 64 SSBs, the 64 SSBs are divided into 8 SSB groups, and each of the 8 SSB groups comprises 8 SSBs;

each bit in the group bitmap corresponds to a respective one of the 8 SSB groups;

each bit in the in-group bitmap corresponds to a respective SSB in one of the eight SSB groups.

\* \* \* \* \*